(12) United States Patent
Salter et al.

(10) Patent No.: US 11,370,471 B2
(45) Date of Patent: Jun. 28, 2022

(54) VEHICLE STEERING WHEEL HAVING PROXIMITY SENSOR INPUTS

(71) Applicant: Ford Global Technologies, LLC, Dearborn, MI (US)

(72) Inventors: Stuart C. Salter, White Lake, MI (US); Pietro Buttolo, Dearborn Heights, MI (US); Christian Lange, Ferndale, MI (US); Paul Kenneth Dellock, Northville, MI (US); Aaron Gould, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/995,076

(22) Filed: Aug. 17, 2020

(65) Prior Publication Data
US 2022/0048552 A1    Feb. 17, 2022

(51) Int. Cl.
| | |
|---|---|
| *B26D 1/04* | (2006.01) |
| *B62D 1/04* | (2006.01) |
| *B62D 1/06* | (2006.01) |
| *B60R 11/02* | (2006.01) |
| *G06F 3/044* | (2006.01) |
| *G06F 3/041* | (2006.01) |
| *G01D 5/241* | (2006.01) |
| *G07C 5/08* | (2006.01) |
| *B60R 11/00* | (2006.01) |

(52) U.S. Cl.
CPC .......... *B62D 1/046* (2013.01); *B60R 11/0229* (2013.01); *B62D 1/06* (2013.01); *G01D 5/2417* (2013.01); *G06F 3/0445* (2019.05); *G06F 3/041662* (2019.05); *B60R 2011/001* (2013.01); *G07C 5/0825* (2013.01)

(58) Field of Classification Search
CPC .......... B60R 11/0229; B60R 2011/001; B26D 1/046; B26D 1/06; G01D 5/2417; G06F 3/041662; G06F 3/0445
See application file for complete search history.

(56) References Cited

U.S. PATENT DOCUMENTS

| | | |
|---|---|---|
| 7,084,859 B1 | 8/2006 | Pryor |
| 2009/0195510 A1 | 8/2009 | Saunders |
| 2019/0210630 A1* | 7/2019 | Seok ........................ B62D 1/06 |

(Continued)

FOREIGN PATENT DOCUMENTS

| | | | | |
|---|---|---|---|---|
| DE | 10201500907 A1 * | 7/2016 | ............ | B60R 16/02 |
| DE | 102015200907 A1 | 7/2016 | | |

(Continued)

*Primary Examiner* — Liliana Cerullo
(74) *Attorney, Agent, or Firm* — Vichit Chea; Price Heneveld LLP

(57) ABSTRACT

A vehicle steering wheel is provided that includes a rotatable rim comprising a core structure, a steering angle sensor sensing an angle of rotation of the rim, and a plurality of proximity sensors located on the rim and spaced apart from one another along an arc length. The vehicle steering wheel also includes a controller processing sensed outputs generated by each of the plurality of proximity sensors and determining operator input commands based on the sensed outputs. The controller assigns a function to each of the proximity sensors that changes as the rim is rotated at an angle such that a given function associated with a proximity sensor remains at the same position in space.

19 Claims, 9 Drawing Sheets

(56) References Cited

U.S. PATENT DOCUMENTS

| | | | | |
|---|---|---|---|---|
| 2019/0248402 A1* | 8/2019 | Trachte | ................. | B62D 1/046 |
| 2019/0291769 A1* | 9/2019 | Kim | ..................... | G06F 3/0482 |
| 2020/0089357 A1* | 3/2020 | Grau | ....................... | H03M 1/22 |
| 2021/0389842 A1* | 12/2021 | Fujiyoshi | ................. | B62D 1/04 |

FOREIGN PATENT DOCUMENTS

| | | | | |
|---|---|---|---|---|
| TW | 201712520 A | * | 4/2017 | ......... G06F 3/04184 |
| WO | 2014058087 A1 | | 4/2014 | |
| WO | WO-2020/083544 A1 | * | 4/2020 | ............. F16H 59/08 |

\* cited by examiner

VEHICLE STEERING WHEEL HAVING PROXIMITY SENSOR INPUTS

FIELD OF THE DISCLOSURE

The present disclosure generally relates to vehicle steering wheels, and more particularly relates to a vehicle steering wheel having proximity sensors or switches for receiving user input commands.

BACKGROUND OF THE DISCLOSURE

Motor vehicles are commonly equipped with a user manipulated steering wheel that may include various user input control buttons for controlling vehicle functions. For example, cruise control, radio volume control, radio menu selections and other control functions may be input with various input buttons, such as pushbutton switches typically located on the central portion or the spokes that interconnect the rim of the steering wheel to the steering wheel shaft. As the steering wheel is rotated, the various input control buttons are likewise rotated to different angular positions.

SUMMARY OF THE DISCLOSURE

According to a first aspect of the present disclosure, a vehicle steering wheel is provided. The vehicle steering wheel includes a rotatable rim comprising a core structure, a steering angle sensor sensing an angle of rotation of the rim, a plurality of proximity sensors located on the rim and spaced apart from one another along an arc length, and a controller processing sensed outputs generated by each of the plurality of proximity sensors and determining operator input commands based on the sensed outputs, wherein the controller assigns a function to each of the proximity sensors that changes as the rim is rotated at an angle such that a given function associated with a proximity sensor remains at the same position in space.

Embodiments of the first aspect of the disclosure can include any one or a combination of the following features:
- a cover wrap surrounding the plurality of proximity sensors and the core;
- a display disposed within an opening defined by the rim;
- the display displays a function identifier associated with at least one sensor of the plurality of proximity sensors;
- the plurality of proximity sensors comprises proximity sensors located on multiple sides of the rim;
- the plurality of proximity sensors are located on a front, back, top and bottom side of the rim;
- each of the proximity sensors is configured to detect a user touch command and a user pressure command, and wherein the controller controls one or more vehicle related operations based on at least one of the user touch command and the user pressure command;
- each of the proximity sensors includes a first electrode, a second electrode, and a compliant dielectric layer disposed between the first and second electrodes, wherein the controller processes signals associated with the first and second electrodes and selectively reconfigures operation of the first and second electrodes in different proximity sensor arrangements to provide a first capacitive sensor configured to sense touch and a second capacitive sensor configured to sense pressure;
- the first electrode comprises a pair of electrodes that are configurable to generate a mutual capacitance to provide a first capacitive sensor and are further configurable to generate a self-capacitance to provide a second capacitive sensor;
- the pair of electrodes comprises a first plurality of capacitive fingers and a second plurality of capacitive fingers, wherein the first plurality of capacitive fingers are interdigitated with the second plurality of capacitive fingers; and
- the controller sequentially samples signals associated with each of the first, second and third capacitive sensors.

According to a second aspect of the present disclosure, a vehicle steering wheel is provided. The vehicle steering wheel includes a rotatable rim comprising a core structure, a steering angle sensor sensing an angle of rotation of the rim, a plurality of capacitive sensors located on the rim and spaced apart from one another along an arc length, a controller processing outputs generated by each of the plurality of capacitive sensors and determining operator input commands based on the sensed outputs, wherein the controller assigns a function to each of the capacitive sensors that changes as the rim is rotated at an angle such that a given function associated with a capacitive sensor remain at the same position in space, and a display disposed within an opening defined by the rim, wherein the display displays a function identifier associated with at least one sensor of the plurality of capacitive sensors.

Embodiments of the second aspect of the disclosure can include any one or a combination of the following features:
- a cover wrap surrounding the plurality of capacitive sensors and the core;
- the plurality of capacitive sensors comprises capacitive sensors located on multiple sides of the rim;
- the plurality of capacitive sensors are located on a front, back, top and bottom side of the rim;
- each of the capacitive sensors is configured to detect a user touch command and a user pressure command, and wherein the controller controls one or more vehicle related operations based on at least one of the user touch command and the user pressure command;
- each of the capacitive sensors includes a first electrode, a second electrode, and a compliant dielectric layer disposed between the first and second electrodes, wherein the controller processes signals associated with the first and second electrodes and selectively reconfigures operation of the first and second electrodes in different capacitive sensor arrangements to provide a first capacitive sensor configured to sense touch and a second capacitive sensor configured to sense pressure;
- the first electrode comprises a pair of electrodes that are configurable to generate a mutual capacitance to provide a first capacitance sensor and are further configurable to generate a self-capacitance to provide a second capacitive sensor; the pair of electrodes comprises a first plurality of capacitive fingers and a second plurality of capacitive fingers, wherein the first plurality of capacitive fingers are interdigitated with the second plurality of capacitive fingers; and
- the controller sequentially samples signals associated with each of the first, second and third capacitive sensors.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1A:
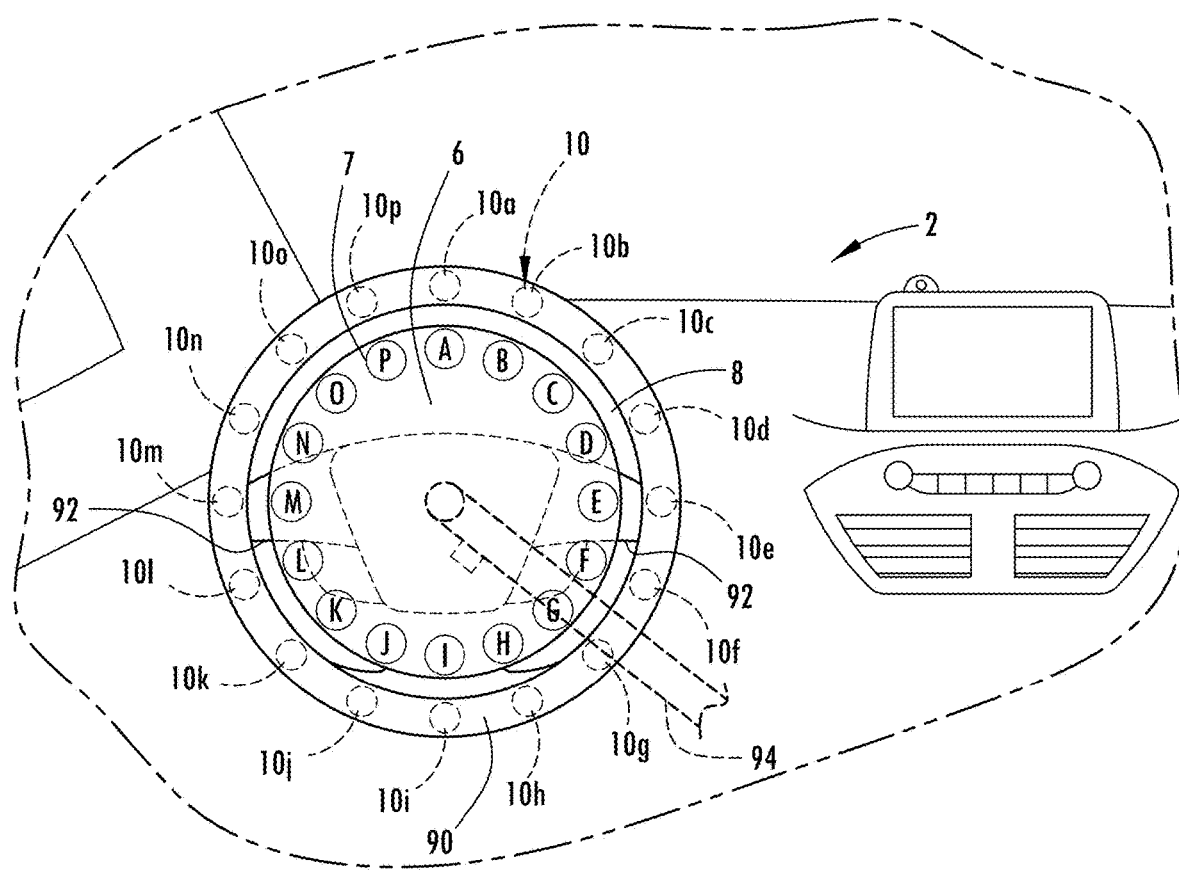
FIG. 1A is a front perspective view of the interior of a motor vehicle having a steering wheel equipped with a plurality of user inputs.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle steering wheel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1A-3, a vehicle steering wheel 4 is generally illustrated located in a motor vehicle 2. The vehicle steering wheel 4 includes a rim 90 having a core structure 24 and a plurality of proximity sensors 10a-10p arranged on the rim 90 to sense user input commands. The steering wheel 4 includes a controller configured to process outputs generated by each of the plurality of proximity sensors 10a-10p and determining operator input commands based on the sensed outputs, wherein the controller assigns a function to each of the proximity sensors that changes as the steering wheel 4 is rotated at an angle such that a given function associated with a proximity sensor remains at the same position in space.

Referring to FIG. 1A, a passenger compartment of the motor vehicle 2 is generally illustrated equipped with the steering wheel 4, according to one embodiment. The vehicle 2 may be a wheeled motor vehicle using the steering wheel 4 for steering the direction of the steerable wheels, such as for a car, a truck, a van, a bus, a sport utility vehicle (SUV) or for steering other steerable vehicles having a steering wheel, such as a boat. The vehicle 2 is shown having a body defining the passenger compartment which typically has one or more seats configured to seat one or more passengers. The steering wheel 4 is generally positioned in front of a driver's seat to enable the seated driver to engage and operate the steering wheel 4 with his/her hands to rotate the steering wheel 4 in clockwise and counter clockwise directions. The steering wheel 4 is generally shown extending vehicle rearward from a vehicle dashboard as is commonly configured in driver steered vehicles. The steering wheel 4 has a rim 90 that is generally ring-shaped and one or more spokes 92 or other connecting structure that interconnects the rim 90 with a steering wheel shaft 94. The steering wheel shaft 94 rotates with the rotation of steering wheel 4 and has a steering wheel angle sensor 96, such as an optical sensor, to sense the rotational position of the steering wheel 4.

The steering wheel 4 is shown having a plurality of proximity sensors in the form of capacitive sensors located at different angular positions of the steering wheel 4. Included with the plurality of proximity sensors are sixteen capacitive sensor assemblies 10a-10p which are equi-angulated disposed at angle α such as 22.5° along the rim 90 of steering wheel 4, according to one example. Sensors 10a-10p are shown separated from one another with a dead zone B. Each capacitive sensor assembly 10a-10p may include capacitive sensors located at various locations around the circumference of the rim 90 of the steering wheel 4, such as on the front, back, top and bottom sides of the steering wheel 4, according to one embodiment.

Located centrally within the rim 90 of the steering wheel 4 is an opening containing a display screen 6 which may be positioned on or over the spokes 92. The display screen 6 may display alphanumeric and displayed characters to a passenger. The display screen 6 may include a touchscreen that enables user inputs to be entered on the display in addition to viewing outputs on the display. A gap 8 is shown located between the display screen 6 and the rim 90 of the steering wheel 4 to enable a user to manipulate or place their fingers or thumb along the inside of the rim 90 of the steering wheel 4. The display screen 6 may be fixed to the spokes 92 or other support of the steering wheel 4 and generally rotates in sync with the steering wheel 4 as the steering wheel 4 is rotated clockwise or counter clockwise. The display screen 6 may display indicators 7 labelled 7A-P which indicate the function associated with each capacitive sensor assembly 10a-10p. The indicators A-P may be in the form of one or more of symbols, icons, letters, words, numbers or other indicia.

Figure 1B:
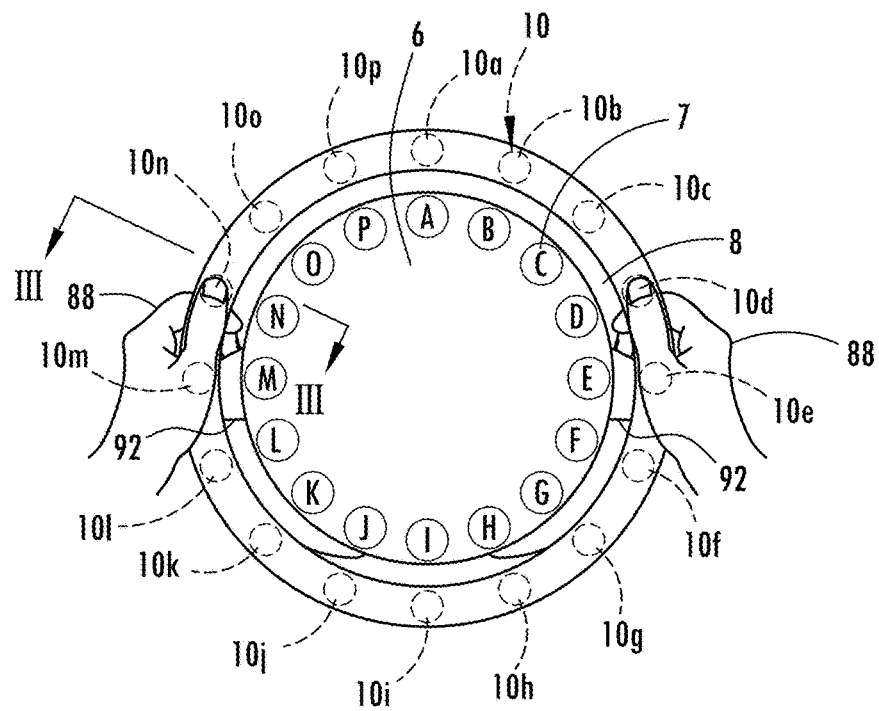
FIG. 1B is a front view of the steering wheel shown gripped by a user and in a first angular position.
Figure 1C:
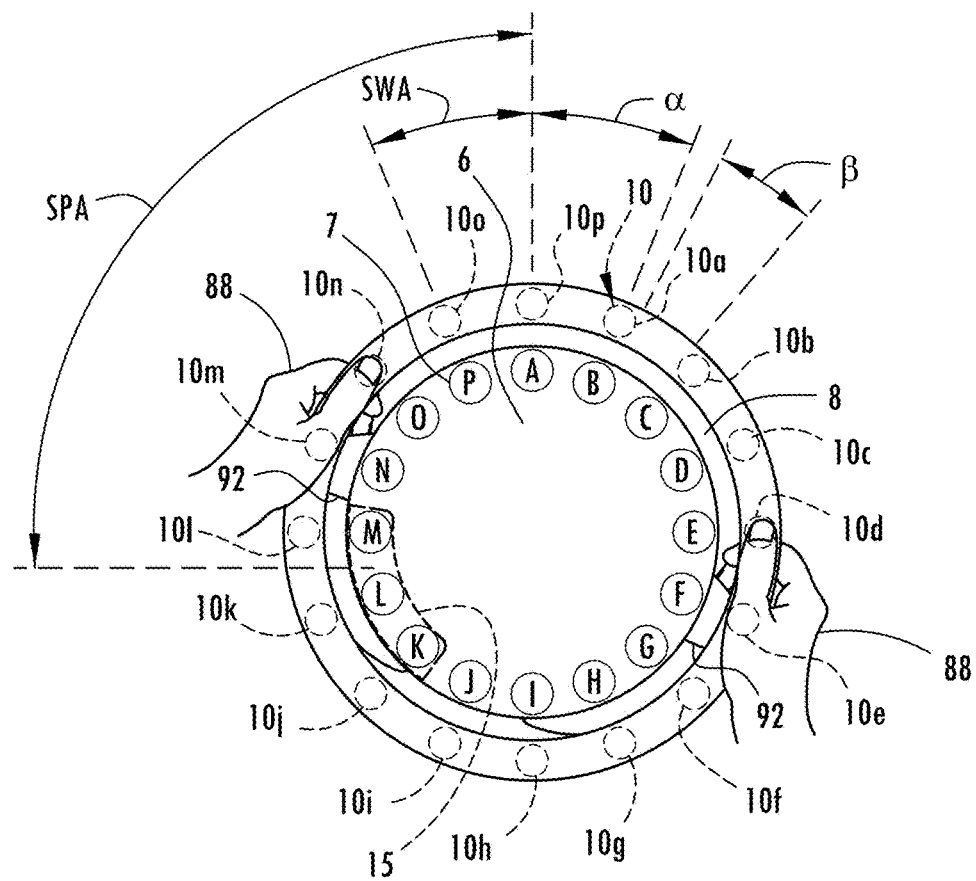
FIG. 1C is a front view of the steering wheel shown rotated to a second angular position relative to the first angular position shown in FIG. 1B.

As seen in FIGS. 1B and 1C, as the steering wheel 4 is rotated clockwise, the plurality of capacitive sensor assemblies 10a-10p on the rim 90 likewise rotate clockwise. Each of the plurality of proximity sensor assemblies 10a-10p has a function designated thereto by the controller which is performed responsive to an input commanded by a user sensed by each of the sensor proximity assemblies 10a-10p. For example, sensor assembly 10a shown at the top of the rim 90 of the steering wheel 4 in FIG. 1B may be dedicated to a function such as turning a radio on or off. A function identifier A may be displayed as indicator 7 on the display screen 6 proximate to proximity sensor 10a. As the rim 90 of the steering wheel 4 is rotated clockwise, such as by steering wheel angle SWA of 22.5° for example as seen in FIG. 1C relative to FIG. 1B, the proximity sensor assemblies 10a-10p on the rim 90 likewise rotate by an angle of 22.5°. The controller monitors the position of the rotation of the steering wheel 4 sensed with the steering wheel angle sensor 96 and reassigns the function to another proximity sensor assembly located at the same position in space as seen in FIG. 1B. As such, the function associated with a capacitive sensor assembly at the top or twelve o'clock position on the steering wheel 4 remains the same regardless of the rotation of the steering wheel 4. As the steering wheel 4 rotates by a steering wheel angle SWA of 22.5° from the position shown in FIG. 1B to the position shown in FIG. 1C, the function indicated by function identifier A changes from sensor assembly 10a in FIG. 1B to sensor assembly 10p in FIG. 1C. The functions assigned to the remaining sensor assemblies likewise change.

Each of the sensors 10a-10p may have a single function assigned thereto or may be combined with other sensors to provide a multifunction switch pack such as shown by identifier 15. The multifunction switch pack 15 is shown employing three sensors 10j-10l with identifiers K-M. The switch pack 15 is shown offset from a reference twelve o'clock position by an angle identified as identifier SPA. The middle sensor 10k may be used, for example, to select an audio device, whereas sensors 10j and 10l may be used to control volume increase and decrease, respectively. It should be appreciated that any number of multifunction switch packs may be employed.

Figure 2:
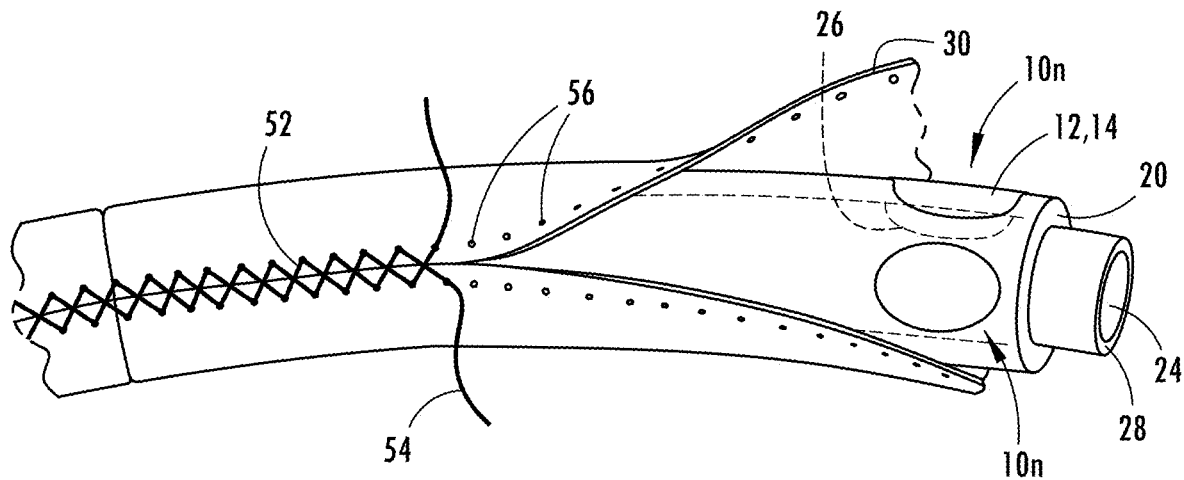
FIG. 2 is an enlarged partially assembled view of a portion of the steering wheel showing various layers of the steering wheel.

Referring to FIG. 2, a portion of the ring-shaped rim 90 of the steering wheel 4 is generally illustrated partially assembled so as to illustrate the various layers of the steering wheel 4. The steering wheel 4 includes a rigid core 24 which is shown in a generally cylindrical cross-sectional shape which may be made of magnesium or aluminum, according to some examples. The core 24 may also be referred to as an armature for providing structural support and shape to the steering wheel 4. Surrounding the core 24 is a compliant layer 20 that may be made of polyurethane or foam. The compliant layer 20 may have a generally cylindrical shape and provides compressibility with memory that allows for a soft or cushioned feel to the steering wheel 4. The compliant layer 20 and core 24 together provide a core structure of the steering wheel 4. The capacitive sensors 10a-10p are shown located on top of the compliant layer 20. Disposed over the complaint layer 20 and capacitive sensors 10a-10p is a cover layer 30, such as a leather cover. The cover layer 30 may be sewn onto the core structure with the use of stitching 54 applied through holes 56 to provide a stitch pattern 52.

Figure 3:
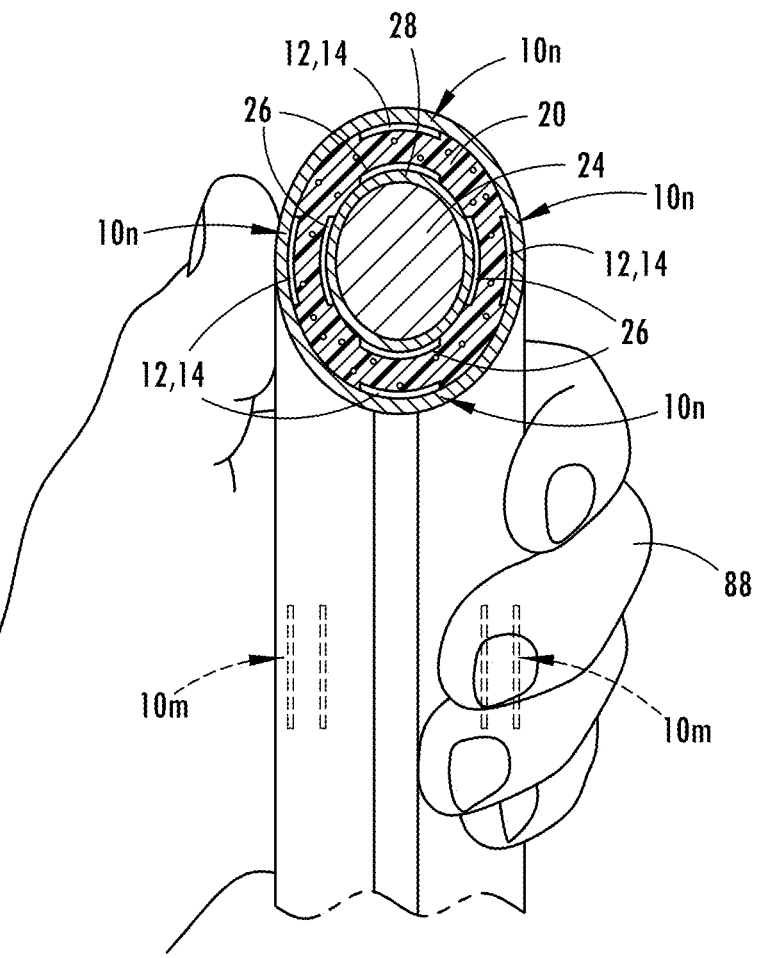
FIG. 3 is a perspective cross-sectional view of the steering wheel taken through lines III-III of FIG. 1B illustrating the arrangement of proximity sensors located on the rim, according to one embodiment.

Referring to FIG. 3, the capacitive sensor 10n is shown provided on four sides about the circumference of the rim 90 of the steering wheel 4. As seen, the capacitive sensor 10n is provided on a front side, a rear side, a top side, and a bottom side. As such, a user's hand 88 may be detected on the front, top, back and bottom sides of the rim 90 of the steering wheel 4 by using all four sensors positioned on each of the four sides. It should be appreciated that the proximity or touch of the user's hand on one or more of the capacitive sensors may be detected and that the user's hand may squeeze and pressure applied thereto may be detected with the capacitive sensors 10a-10p. The remaining capacitive sensors may be configured the same as sensor 10n.

Figure 4:
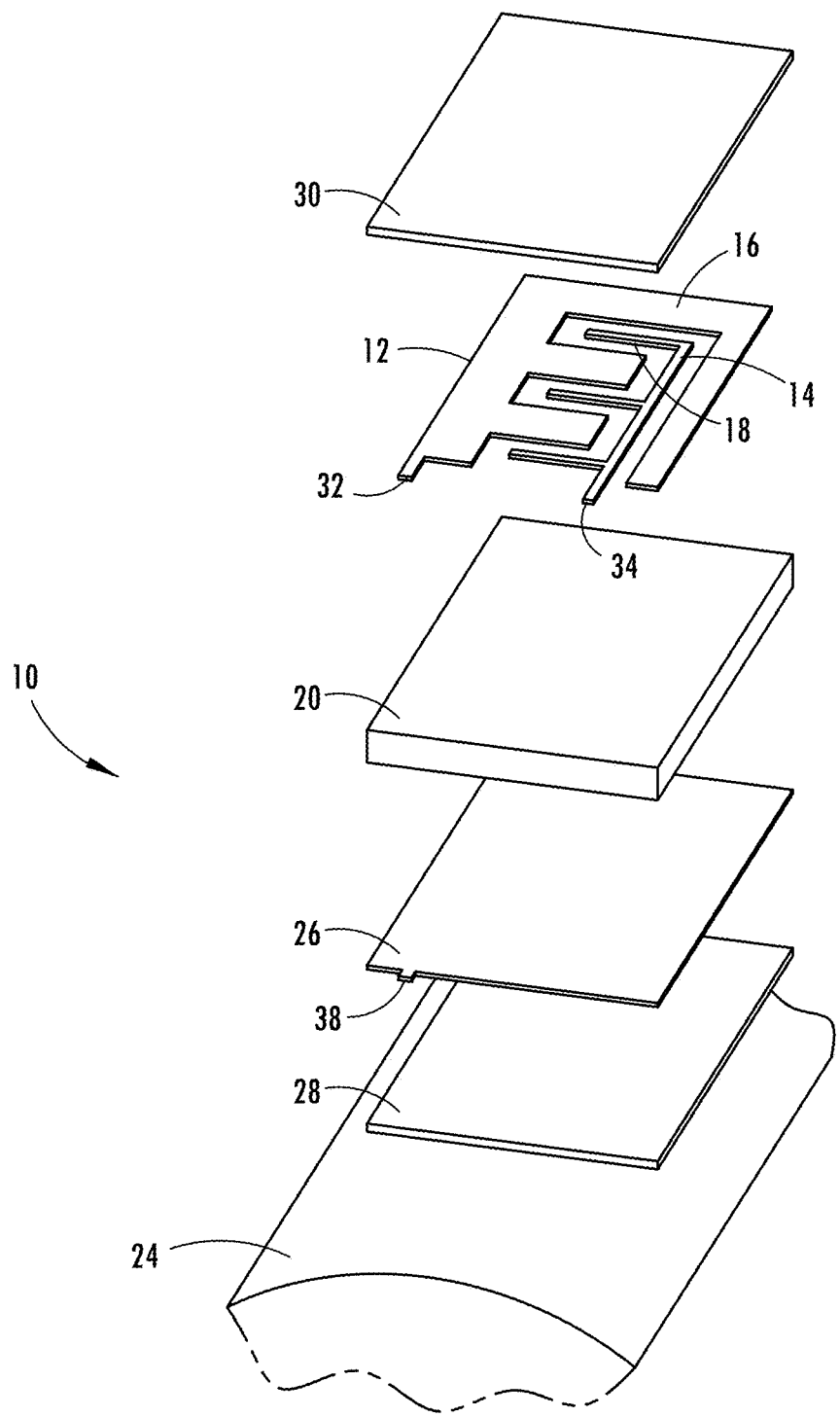
FIG. 4 is an exploded upper front perspective view of a capacitive proximity sensor assembly, according to one embodiment.

A capacitive proximity sensor 10 representation of each of sensors 10a-10p is shown, according to the first embodiment in FIG. 4. The proximity sensor includes three electrodes configured to operate in different sensor modes or states by using a controller to reconfigure the input and output sampling of the signals generated by the various electrodes to operate in different sensor configurations to provide up to three capacitive sensors that may operate as a mutual capacitive sensor or a self-capacitive sensor and to sense input commands, such as touch, proximity and pressure (force/area) or force.

The arrangement of the electrodes in the capacitive proximity sensor 10 illustrated in FIG. 4 has first and second capacitive electrodes 12 and 14 arranged within a common layer and dielectrically isolated from one another via a separation distance. The first electrode 12 has a first plurality of conductive fingers 16 and the second electrode 14 has a second plurality of conductive fingers 18. The first plurality of conductive fingers 16 are interdigitated or interleaved with the second plurality of conductive fingers 18. As a result, the first and second electrodes 12 and 14 may operate in a first mode as a mutual capacitance sensor when one of the electrode signal terminals 32 and 34 is driven with a drive signal and the other of the electrode signal terminals 32 and 34 generates a receive signal when operated in a mutual capacitance mode. When one of the electrode signal terminals 32 and 34 receives a drive signal, that electrode operates as a drive electrode and the other electrode operates as a receive electrode. The drive electrode may receive square wave drive pulses applied at a voltage $V_I$. The receive electrode may have an output for generating an output voltage $V_O$. It should be appreciated that the first and second electrodes 12 and 14 may be arranged in various other configurations for generating a capacitive electric field as an activation field.

In the mutual capacitance sensor mode, the drive electrode is applied with voltage input $V_I$ as square wave pulses having a charge pulse cycle sufficient to charge the receive electrode to a desired voltage. The receive electrode thereby serves as a measurement electrode. When a user or operator, such as a user's finger, enters the activation electric field generally proximate the top front side of the proximity sensor assembly 10, the proximity sensor assembly 10 detects the disturbance caused by the finger to the activation electric field and determines whether the disturbance is sufficient to detect a touch input sufficient to activate a proximity switch or generate a desired output. The disturbance of the activation electric field is detected by processing the charge pulse signal associated with the corresponding signal.

An overlying dielectric cover 30 is provided on the top front side of the first and second electrodes 12 and 14 to provide dielectric isolation and protection of the first and second electrodes 12 and 14. The dielectric cover 30 may include any dielectric materials, such as a dielectric polymer or plastic, leather, wood, a trim component or other dielectric medium. It should be appreciated that the first and second electrodes 12 and 14 may be formed by printing conductive ink in the desired patterns of the electrodes. The ink may be printed on the rear surface of the dielectric cover 30, according to one embodiment or may be printed on the front surface of the dielectric layer 20 therebelow. The first and second electrodes 12 and 14 may otherwise be formed by placing preformed conductive electrodes between the dielectric cover 30 and the compliant dielectric layer 20.

Disposed below the first and second electrodes 12 and 14 is the compliant dielectric layer 20. The compliant dielectric layer 20 has a relatively soft material that is compliant and deformable when pressure, which is force applied over an area, is applied to the front of the cover 30 so as to squeeze and deform the first compliant dielectric layer 20. According to one example, the compliant dielectric layer 20 may be a soft foam material.

Located below the compliant dielectric layer 30 is a third electrode 26. The third electrode 26 is shown formed as a sheet of conductive material, according to one embodiment. The third electrode 26 has a signal terminal 38 to allow for communication of signals with the controller. The third electrode 26 may operate in one sensor mode as a mutual capacitive sensor that detects pressure applied to the top front surface which causes deformation of the compliant dielectric layer 20. As the compliant dielectric layer 20 is squeezed due to pressure and deforms, at least a portion of the pair of the first and second electrodes 12 and 14, which may be shorted together to form a single electrode or operated individually, moves towards the third electrode 26. When this occurs, the controller detects the relative position of the pair of first and second electrodes 12 and 14 relative to the third electrode 26. In other sensor modes, the third electrode 26 may be open circuited to operate as a shield for the first and second electrodes 12 and 14 located thereabove or the third electrode 26 located therebelow. When operated as a shield, the third electrode 26 may be open circuited such that there is no applied voltage applied or may be driven to a desired voltage, according to various embodiments.

A further bottom dielectric layer 28 is shown provided below the third electrode 26 so as to dielectrically isolate the third electrode 26 on the bottom side. In one embodiment, the bottom dielectric 28 may be a dielectric backing material.

Figure 5:
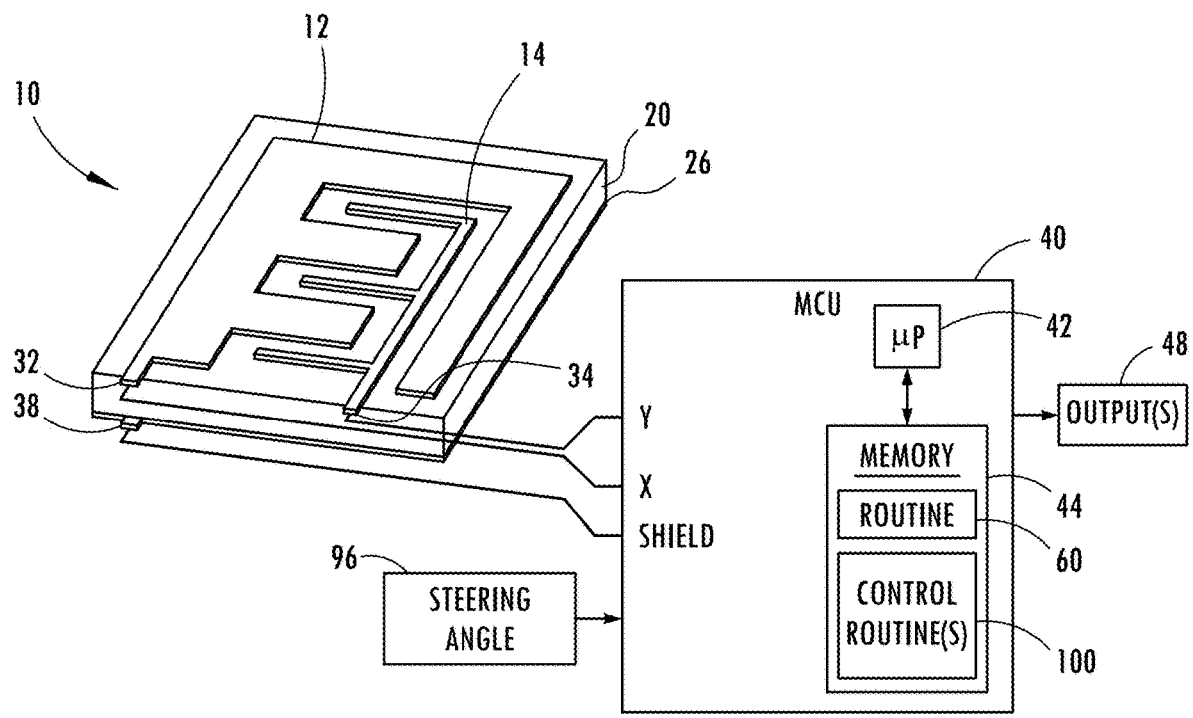
FIG. 5 is a front perspective view of the capacitive proximity sensor shown in FIG. 4 with a controller configured to sample signals in a first sensor mode.
Figure 6:
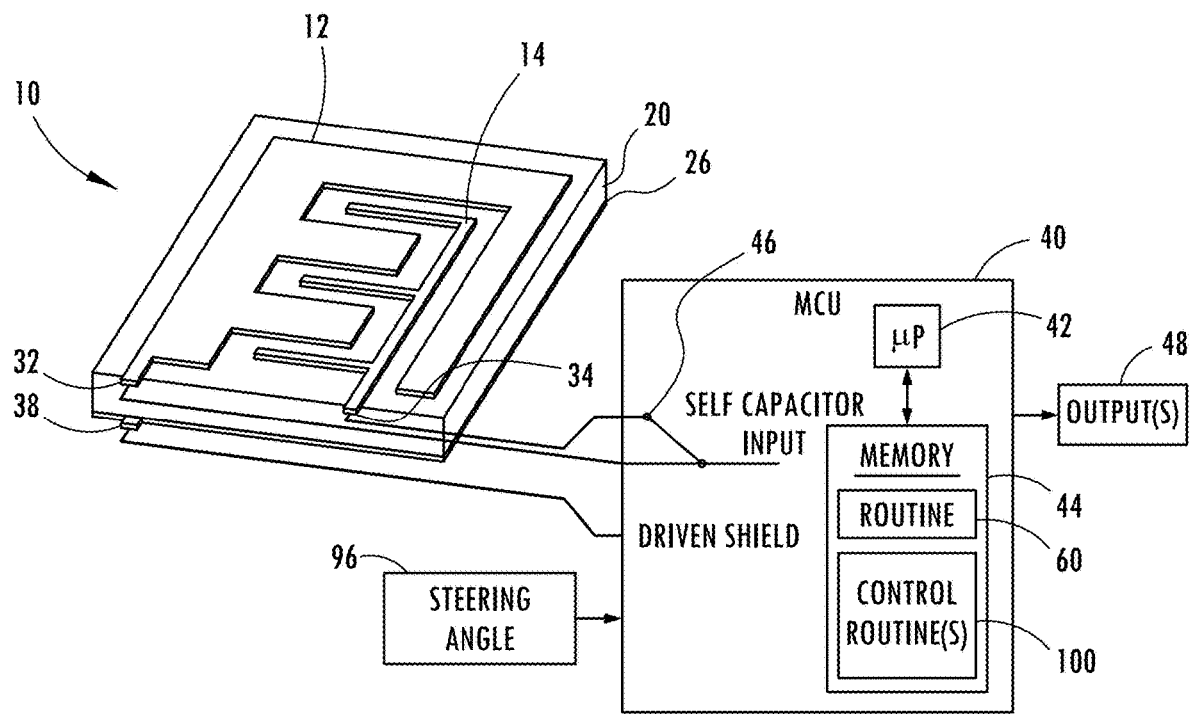
FIG. 6 is a front perspective view of the capacitive proximity sensor shown in FIG. 4 with the controller configured to sample signals in a second sensor mode.

Referring to FIGS. 5-10, the various operating sensor modes of the electrode configurations as controlled by a controller 40 are illustrated for one embodiment of one of the sensors of the capacitive proximity sensor assembly 10. As best seen in FIGS. 4-6, the controller 40 may include a microprocessor 42 and memory 44 configured with one or more routines 60, 100. The controller 40 may be a micro control unit (MCU) having firmware, according to one example. It should be appreciated that other analog and/or digital circuitry may be used to provide the controller 40. The controller 40 includes various inputs/outputs including three inputs/outputs connected to the respective signal terminals 32, 34 and 38 associated with the first, second and third electrodes 12, 14 and 26. Additionally, the controller 40 may generate one or more outputs 48 based on the sensed signals. For example, the controller 40 may provide proximity switch outputs based on the proximity sensing such that the capacitive proximity sensor assembly 10 operates as one or more capacitive proximity switches, according to various examples.

Figure 8:
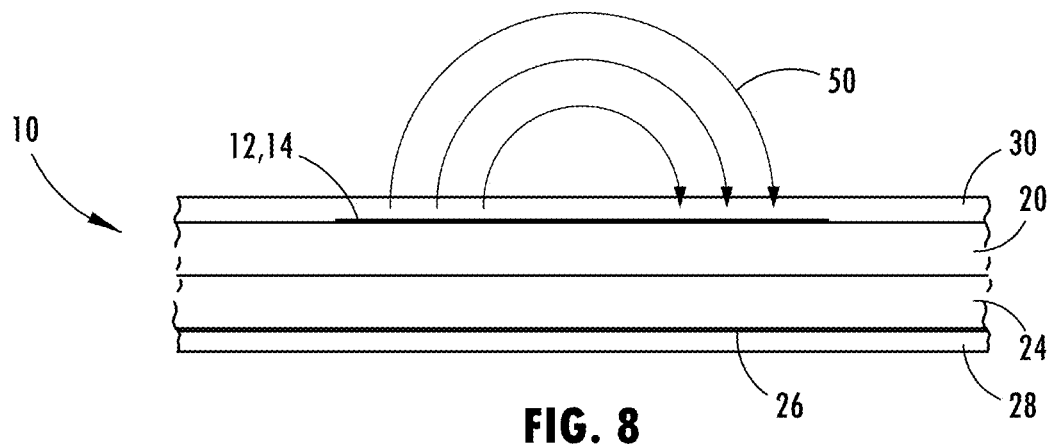
FIG. 8 is a cross-sectional view of the capacitive proximity sensor of FIG. 4 further illustrating the electric field generated in the first sensor mode.

Referring to FIGS. 5 and 8, the proximity sensor assembly 10 is configured according to a first sensor mode in which the first and second electrodes 12 and 14 form a mutual capacitance with each other to serve as a first sensor that may be used to sense touch or close proximity of a user at or near the top front surface of cover 30. In this sensor mode, the third electrode 26 is open-circuited via the controller 40 so as to form a conductive shield that may enhance the mutual capacitance between the first electrode 12 and second electrode 14. The first electrode 12 may receive a drive signal X and the second electrode 14 may supply a receive signal Y. As seen in FIG. 8, the activation electric field is generated due to a mutual capacitive coupling of the first and second electrodes 12 and 14 as illustrated by arrows 50 to enable the detection of touch or movement, e.g., swipe, on or above the front cover 30 (e.g., within 30 millimeters).

Figure 9:
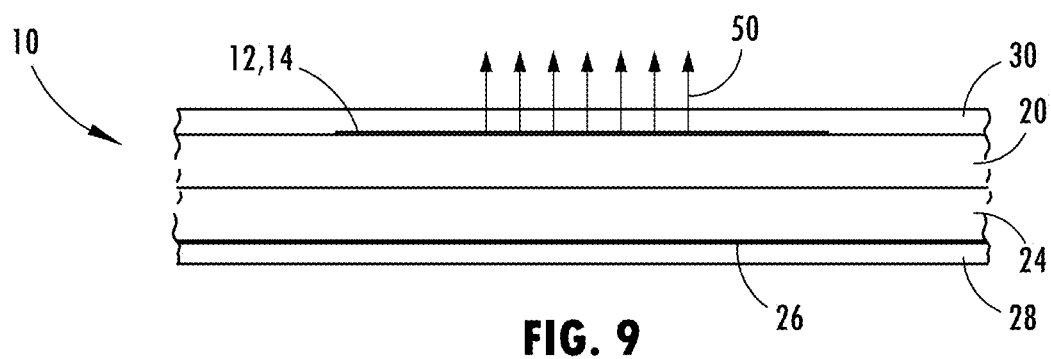
FIG. 9 is a cross-sectional view of the capacitive proximity sensor of FIG. 4 further illustrating the electric field generated in the second sensor mode.

The controller 40 may sequentially switch the capacitive proximity sensor assembly 10 amongst the various sensor modes at a rapid speed simply by changing the inputs and outputs and thereby reconfiguring the sensing arrangement to sequentially provide first, second and third sensors. Referring to FIGS. 6 and 9, the capacitive proximity sensor assembly 10 is shown in the second sensor mode in which the first and second electrodes 12 and 14 are electrically shorted together to form a single electrode, and the third electrode 26 is driven to a desired voltage to provide a shield. To electrically short the first and second electrodes 12 and 14 together, the controller 40 may include a switch 46 that may be implemented in firmware or otherwise implemented with an analog or digital switch. In this sensor mode, the first and second electrodes 12 and 14 which are shorted together receives a self-capacitor input to generate an activation electric field illustrated by arrows 50 to form a self-capacitive second sensor as seen in FIG. 9 in which the activation electric signal may detect objects above the top front cover 30 at an extended distance (e.g., a distance up to 30 centimeters). The self-capacitor input may apply a voltage for half of a cycle to charge the electrode and may sense capacitance during the other half of the cycle.

Figure 7:
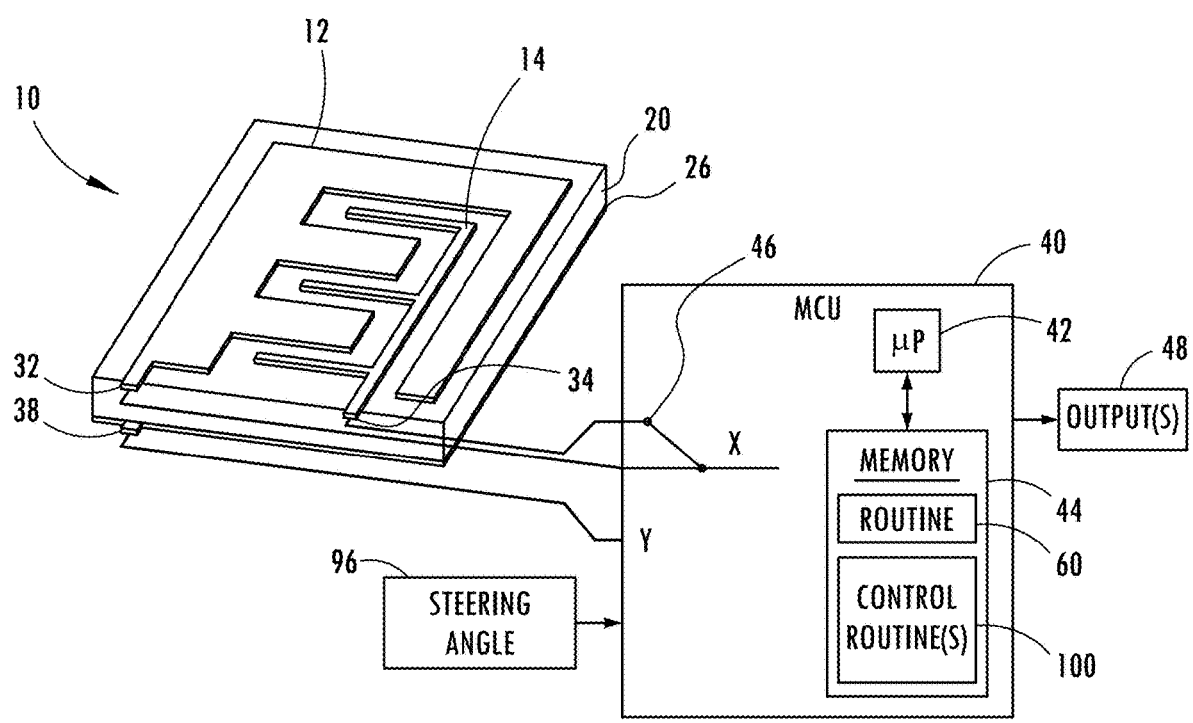
FIG. 7 is a front perspective view of the capacitive proximity sensor shown in FIG. 4 with the controller configured to sample signals in a third sensor mode.
Figure 10:
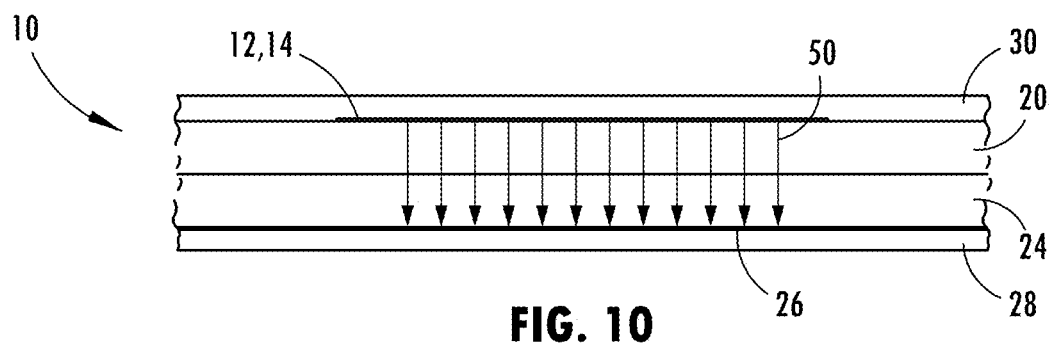
FIG. 10 is a cross-sectional view of the capacitive proximity sensor of FIG. 4 further illustrating the electric field generated in the third sensor mode.

Referring to FIGS. 7 and 10, the capacitive proximity sensor assembly 10 is illustrated in the third sensor mode in which the first and second electrodes 12 and 14 are electrically shorted together via the switch 46 as controlled by controller 40 and receive the drive signal X, and the third electrode 26 supplies the receive signal Y. It should be appreciated that the short-circuited first and second electrodes 12 and 14 may receive the drive signal X to form a mutual capacitance with the third electrode 26 to provide a third sensor. As such, movement of the shorted together first and second electrodes 12 and 14 relative to third electrode due to compression of the first compliant dielectric layer 20 may be detected as an indication of the amount of force or pressure applied to the front surface of the cover 30 on the cover layer 5. The activation electric field between the shorted-circuited first and second electrodes 12 and 14 and the third electrode 26 is illustrated by arrows 50 in FIG. 10.

Accordingly, it should be appreciated that the controller 40 may sequentially switch between the first, second and third sensor modes as illustrated in FIGS. 6-10 at a rapid pace so as to sequentially configure the capacitive proximity sensor assembly 10 in various sensor configurations referred to as first, second and third sensors and sample sensed signals to sense a sensed condition in each sensor mode. This may be achieved by the controller 40 switching the drive signal X and the receive signal Y between the various inputs and outputs and sampling the signals over a short period of time such as 20 milliseconds and then switching sequentially to the next sensor mode, repeatedly. As such, multiple sensors may be realized with the capacitive proximity sensors 10a-10p. The sensor signals may be compared to threshold values to act as switches to trigger an output response. The sensor functions associated with one or more of each of the sensor modes may be used to detect user inputs for each proximity sensor assembly.

Figure 11:
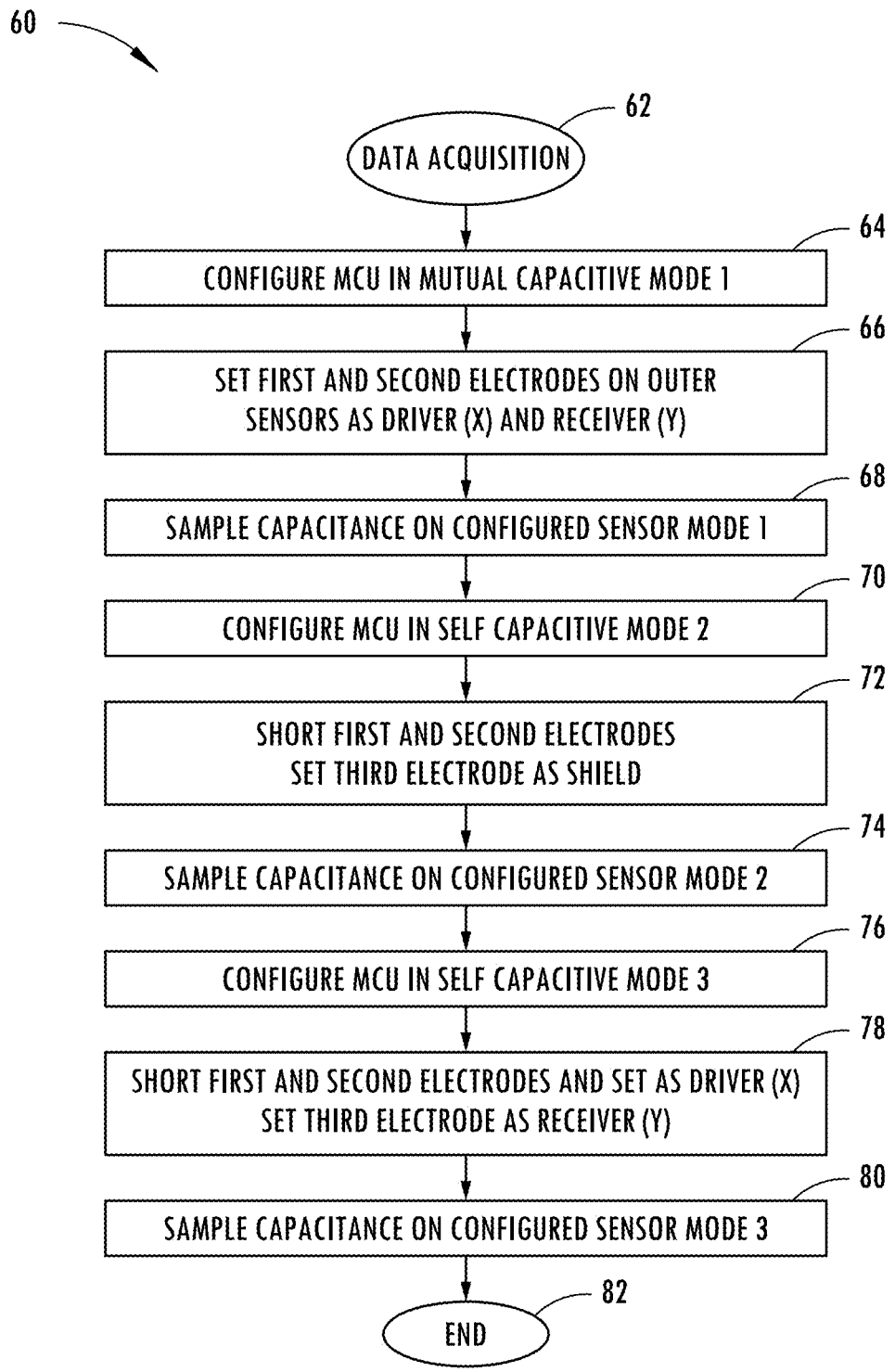
FIG. 11 is a flow diagram illustrating a route for sampling and measuring signals generated by the capacitive proximity sensor assembly of FIG. 4 in the first, second and third sensor modes.

Referring to FIG. 11, a routine 60 for controlling the controller 40 to sequentially switch the capacitive proximity sensor 10 amongst the various operating modes is illustrated, according to one embodiment. The routine 60 is shown for operating the capacitive proximity sensor assembly 10 according to the first embodiment in each of sensor modes 1-3. It should be appreciated that the routine 60 may be executed by the microprocessor 42 in the controller 40 and that the routine 60 may be stored in memory 44. The routine 60 may sample data and reconfigure the capacitive proximity sensor assembly 10 in the various modes at a sampling rate of about 20 milliseconds, according to one example. It should be appreciated that other sampling rates may be employed.

Routine 60 begins at step 62 to acquire data and then proceeds to step 64 to configure the controller in a first mutual capacitance sensor mode 1. In sensor mode 1, routine 60 proceeds to step 66 to set the first electrode with the drive signal X and to set the second electrode with the drive receive signal Y, and may set the third electrode as a shield. Thereafter, routine 60 proceeds to step 68 to sample the capacitance on the configured mutual capacitance sensor in sensor mode 1. Sensor mode 1 may sense touch commands which may be used to perform a function such as displaying information and activating certain devices such as lighting devices.

Next, routine 60 proceeds to step 70 to configure the controller in a self-capacitance sensor mode 2. In mode 2, routine 60 proceeds to step 72 to electrically short-circuit the first and second electrodes together, and to set the third electrode as a shield. The shorted together first and second electrodes receive a self-capacitance input signal. Next, at step 74, routine 60 samples the capacitance of the configured self-capacitance sensor in sensor mode 2. Sensor mode 2 may be used to determine detection of an object proximate to the sensor.

Next, routine 60 proceeds to step 76 to configure the controller in a mutual capacitance sensor mode 3. This includes electrically short-circuiting the first and second electrodes together and setting the combined first and second electrodes with the drive signal X, and setting the third electrode with the receive signal Y in step 78. Next, in step 80, the capacitance of the configured mutual capacitance sensor in sensor mode 3 is sampled before ending at step 82. Sensor mode 3 may detect pressure applied by a user to the steering wheel input and may be used to command a function different from a user touch command.

It should be appreciated that the routine 60 may be repeated sequentially at a rapid pace, such that the sampling between the execution of the sensor configurations in modes 1, 2 and 3 may occur at a sampling rate of 20 milliseconds, for example. As a result, the capacitive proximity sensor assembly 10 is able to operate sequentially in multiple modes with different configurations of capacitive sensors to sense various signals, particularly objects and input commands in four sensor modes pursuant to the first embodiment.

Figure 12:
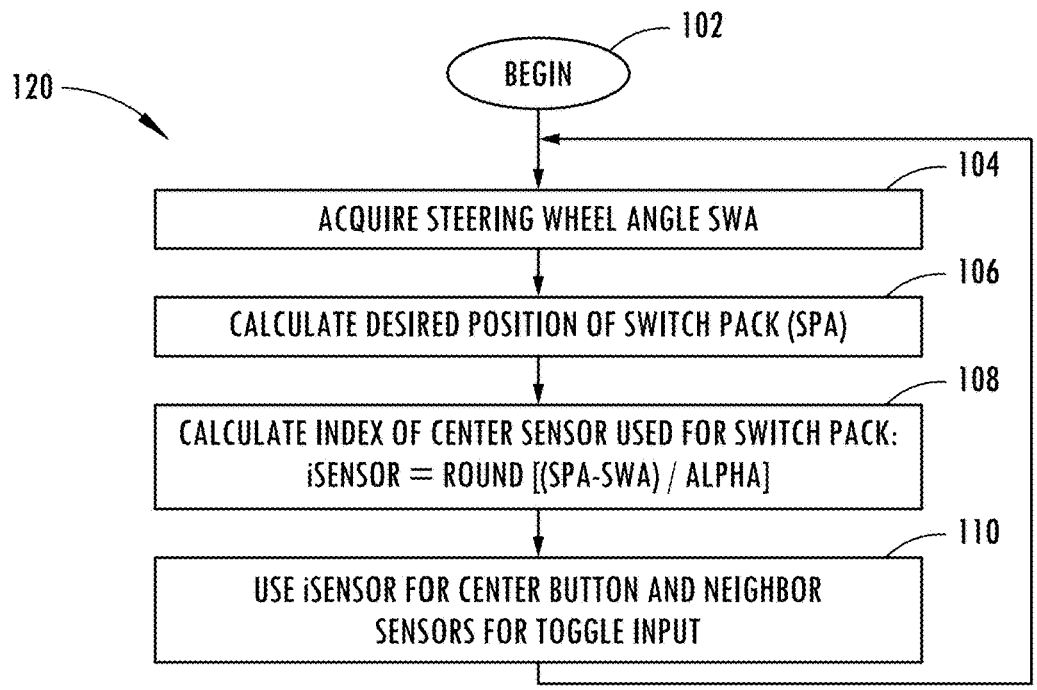
FIG. 12 is a flow diagram illustrating one embodiment of a routine for controlling the input function based on rotational position of the steering wheel.

Referring to FIG. 12, a routine 100 for controlling the input function associated with proximity sensors based on rotation position of the steering wheel is shown, according to one embodiment. Routine 100 begins at step 102 and proceeds to step 104 to acquire the steering wheel angle SWA. Next, at step 106, routine 100 calculates the desired position of a multifunction switch pack which is a switch pack angle SPA. At step 108, routine 100 calculates an index of a center sensor used for the multifunction switch pack which may be identified as iSENSOR as a function of the difference between the switch pack angle SPA and the steering wheel angle SWA divided by the sensor distancing angle α and rounded to an integer value. Finally, at step 110, routine 100 uses the iSENSOR value for the center button of the multifunction switch pack and the neighbor sensors for toggle inputs.

Figure 13:
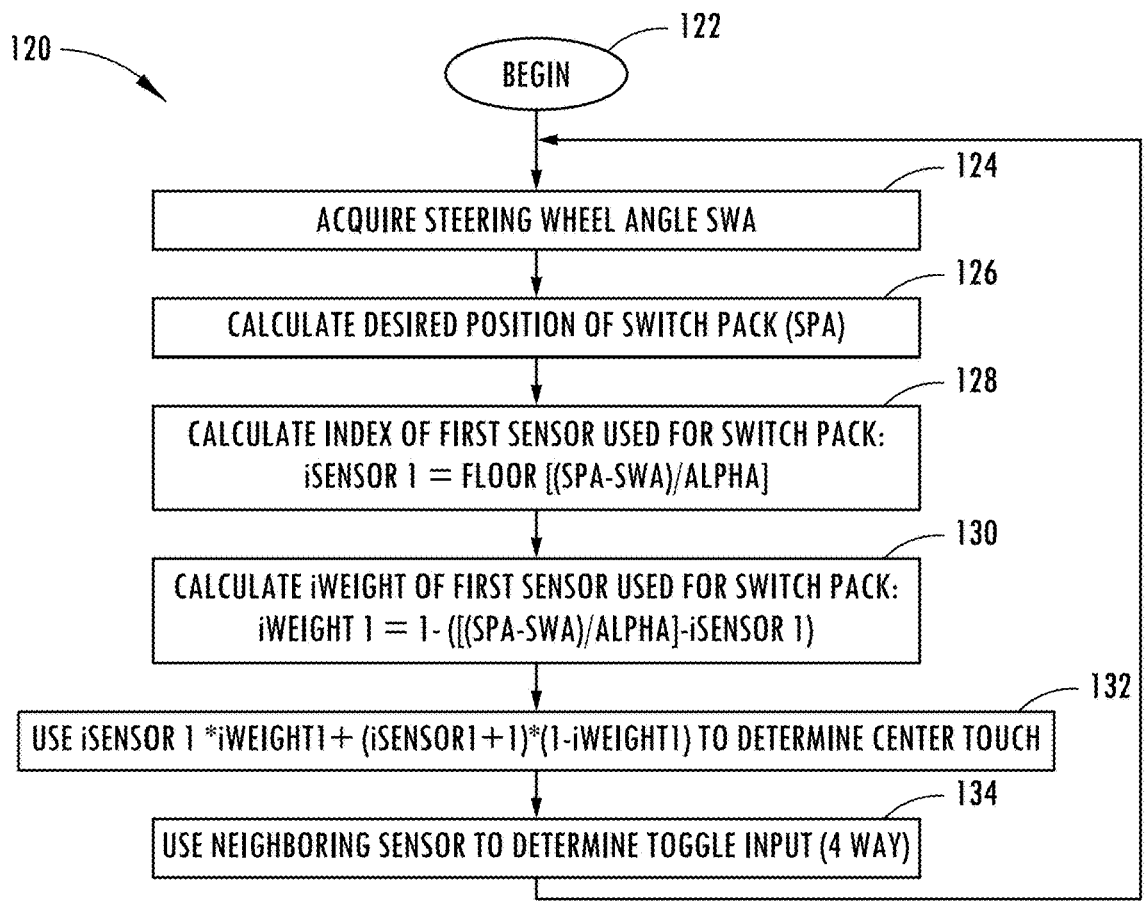
FIG. 13 is a flow diagram illustrating another embodiment of a routine for controlling the input function based on rotational position of the steering wheel.

Referring to FIG. 13, a routine 120 is shown for controlling the input function associated with proximity sensors based on rotational position of the steering wheel, according to another embodiment. In this embodiment, routine 120 begins at step 122 and proceeds to step 124 to acquire the steering wheel angle SWA, and to step 126 to calculate the desired position of the multifunction switch pack SPA. At step 128, routine 120 calculates an index of the first sensor used for the switch pack identified as iSENSOR1 similar to the calculation of step 108 except for the value is rounded down to a floor value integer to eliminate any fractional value. Next, at step 130, routine 120 calculates a weight of the first sensor used for the multifunction switch pack identified as identifier iWEIGHT1. Routine 120 then uses the iSENSOR1 and iWEIGHT1 values to determine a center touch for the multifunction switch pack. At step 134, routine 120 uses the neighboring sensors to determine toggle inputs, for example.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle steering wheel comprising:
    a rotatable rim comprising a core structure surrounded by a compliant dielectric layer;
    a steering angle sensor sensing an angle of rotation of the rim;
    a plurality of proximity sensors located on the rim, surrounding the core structure and spaced apart from one another along an arc length, wherein the plurality of proximity sensors comprises proximity sensors located on multiple sides of the rim including first proximity sensors on a first side of the rim and second proximity sensors on a second side of the rim, wherein each of the first proximity sensors is dialectically isolated from each of the second proximity sensors via the compliant dielectric layer; and
    a controller processing sensed outputs generated by each of the plurality of proximity sensors and determining operator input commands based on the sensed outputs, wherein the controller assigns a function to each of the proximity sensors that changes as the rim is rotated at an angle such that a given function associated with a proximity sensor remains at the same position in space.

2. The vehicle steering wheel of claim 1 further comprising a cover wrap surrounding the plurality of proximity sensors and the compliant dielectric layer and core structure.

3. The vehicle steering wheel of claim 1 further comprising a display disposed within an opening defined by the rim.

4. The vehicle steering wheel of claim 3, wherein the display displays a function identifier associated with at least one sensor of the plurality of proximity sensors.

5. The vehicle steering wheel of claim 1, wherein the plurality of proximity sensors are further located on a third side and a fourth side of the rim.

6. The vehicle steering wheel of claim 5, wherein the first side is a front side, the second side is a back side, the third side is a top side and the fourth side is a bottom side.

7. The vehicle steering wheel of claim 1, wherein each of the proximity sensors is configured to detect a user touch command and a user pressure command, and wherein the controller controls one or more vehicle related operations based on at least one of the user touch command and the user pressure command.

8. The vehicle steering wheel of claim 7, wherein each of the proximity sensors comprises:
    a first electrode;
    a second electrode; and
    the compliant dielectric layer disposed between the first and second electrodes, wherein the controller processes signals associated with the first and second electrodes and selectively reconfigures operation of the first and second electrodes in different proximity sensor arrangements to provide a first capacitive sensor configured to sense touch and a second capacitive sensor configured to sense pressure.

9. The vehicle steering wheel of claim 8, wherein the first electrode comprises a pair of electrodes that are configurable to generate a mutual capacitance to provide a first capacitive sensor and are further configurable to generate a self-capacitance to provide a second capacitive sensor.

10. The vehicle steering wheel of claim 9, wherein the pair of electrodes comprises a first plurality of capacitive fingers and a second plurality of capacitive fingers, wherein the first plurality of capacitive fingers are interdigitated with the second plurality of capacitive fingers.

11. The vehicle steering wheel of claim 10, wherein the controller sequentially samples signals associated with each of the first and second capacitive sensors.

12. A vehicle steering wheel comprising:
    a rotatable rim comprising a core structure surrounded by a compliant electric layer;
    a steering angle sensor sensing an angle of rotation of the rim;
    a plurality of capacitive sensors located on the rim, surrounding the core structure and spaced apart from one another along an arc length, wherein the plurality of capacitive sensors comprises capacitive sensors located on multiple sides of the rim including capacitive sensors located on a front side of the rim and second capacitive sensors located on a back side of the rim, wherein each of the first capacitive sensors is dielectrically isolated from each of the second capacitive sensors via the compliant dielectric layer;
    a controller processing outputs generated by each of the plurality of capacitive sensors and determining operator input commands based on the sensed outputs, wherein the controller assigns a function to each of the capacitive sensors that changes as the rim is rotated at an angle such that a given function associated with a capacitive sensor remain at the same position in space; and a display disposed within an opening defined by the rim, wherein the display displays a function identifier associated with at least one sensor of the plurality of capacitive sensors.

13. The vehicle steering wheel of claim 12 further comprising a cover wrap surrounding the plurality of capacitive sensors and the compliant dielectric layer and core.

14. The vehicle steering wheel of claim 12, wherein the plurality of capacitive sensors are further located on a top side and a bottom side of the rim.

15. The vehicle steering wheel of claim 12, wherein each of the capacitive sensors is configured to detect a user touch command and a user pressure command, and wherein the controller controls one or more vehicle related operations based on at least one of the user touch command and the user pressure command.

16. The vehicle steering wheel of claim 15, wherein each of the capacitive sensors comprises:
a first electrode;
a second electrode; and
the compliant dielectric layer disposed between the first and second electrodes, wherein the controller processes signals associated with the first and second electrodes and selectively reconfigures operation of the first and second electrodes in different capacitive sensor arrangements to provide a first capacitive sensor configured to sense touch and a second capacitive sensor configured to sense pressure.

17. The vehicle steering wheel of claim 16, wherein the first electrode comprises a pair of electrodes that are configurable to generate a mutual capacitance to provide a first capacitance sensor and are further configurable to generate a self-capacitance to provide a second capacitive sensor.

18. The vehicle steering wheel of claim 17, wherein the pair of electrodes comprises a first plurality of capacitive fingers and a second plurality of capacitive fingers, wherein the first plurality of capacitive fingers are interdigitated with the second plurality of capacitive fingers.

19. The vehicle steering wheel of claim 18, wherein the controller sequentially samples signals associated with each of the first and second capacitive sensors.

* * * * *

UNITED STATES PATENT AND TRADEMARK OFFICE
CERTIFICATE OF CORRECTION

PATENT NO. : 11,370,471 B2
APPLICATION NO. : 16/995076
DATED : June 28, 2022
INVENTOR(S) : Salter et al.

It is certified that error appears in the above-identified patent and that said Letters Patent is hereby corrected as shown below:

In the Claims

Column 12:
Claim 12, Line 50;
"electric" should be --dielectric--.
Claim 12, Line 57;
After "including" insert --first--.

Signed and Sealed this
Thirtieth Day of August, 2022

*Katherine Kelly Vidal*
Katherine Kelly Vidal
*Director of the United States Patent and Trademark Office*